April 13, 1965 W. S. JOLLEY 3,177,591
COMPASS WITH MEANS FOR CORRECTING ANGLE OF DECLINATION
Filed Oct. 25, 1962 2 Sheets-Sheet 1

INVENTOR.
WILLIAM S. JOLLEY
BY Eugene M. Echelman
ATTORNEY

April 13, 1965   W. S. JOLLEY   3,177,591
COMPASS WITH MEANS FOR CORRECTING ANGLE OF DECLINATION
Filed Oct. 25, 1962
2 Sheets-Sheet 2

INVENTOR.
WILLIAM S. JOLLEY
BY Eugene M. Eckelman
ATTORNEY

United States Patent Office 3,177,591
Patented Apr. 13, 1965

3,177,591
COMPASS WITH MEANS FOR CORRECTING ANGLE OF DECLINATION
William S. Jolley, 230 NE. 60th, Portland, Oreg.
Filed Oct. 25, 1962, Ser. No. 232,964
7 Claims. (Cl. 33—224)

This invention relates to an improved compass structure and more particularly is concerned with a compass having means for correcting the angle of declination.

It is well known that a magnetic compass of the type which operates in a horizontal plane is directed to the north magnetic pole rather than the north geographic pole. Since navigating means are generally charted in relation to the north geographic pole, corrections in compass readings must be made to compensate for this angle of declination, such angle varying throughout different points on the surface of the earth.

It is therefore an important object of the present invention to provide a compass having means for correcting the angle of declination in a precise, convenient, and rapid manner.

A further object of the invention is to provide a compass with means for correcting the angle of declination comprising vertically separable and rotatably adjustable compass card and magnet means.

Another object is to provide a device of the type described which utilizes a magnetic key adapted to cooperate with the existing compass magnet for rotationally adjusting said compass magnet relative to the compass card.

A further object is to provide a device of the type described which utilizes a pointer for visibly registering the amount of adjustment accomplished, and furthermore to provide such pointer which operates in combination with the compass card for adjustably connecting the latter and the compass magnet.

Briefly stated, the compass card and magnet of the present invention, as employed in a conventional magnetic compass, are arranged in a combination wherein they are normally connected for rotation together but may be disconnected temporarily for relative adjusting rotation. The compass card is arranged such that in its normal position it will rotate freely on a pivot but when a magnet element, referred to herein as a magnet key, is positioned adjacent the housing, the magnet in the compass will be disconnected from a locked position with the compass card and the latter will in turn be locked against rotation whereby the magnet in the compass is adapted to be rotatably adjusted relative to the compass card in order that the north reading of the compass can be adjusted to be directed to the north geographic pole.

The invention will be better understood and additional objects will become apparent from the following specification and claims, considered together with the accompanying drawings, wherein the numerals of reference indicate like parts and wherein:

Figure 1:
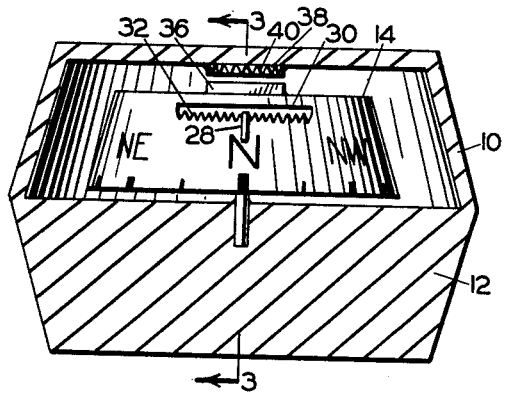
FIG. 1 is an elevational view of a compass embodying a first form of the invention for correcting the angle of declination, the compass being illustrated in its normal functioning condition.

Referring now in detail to the drawings, one form of conventional magnetic compass comprises a transparent housing 10 supported on an integral base portion 12. This housing is generally sealed and contains a liquid therein in which operates a compass card 14 supported on a needle point support 16 projecting upwardly from base portion 12. The compass card comprises an inverted cup-shaped member having a downwardly projecting hub 18 provided with a central bore 20 terminating at its upper end in a tapered seat 22 for rotational engagement with the needle support 16. Associated with the compass card 14 is a magnet 24 which in conventional structures is connected to the compass card to rotate it toward the north magnetic pole.

In accordance with the principles of the present invention, the magnet may be rotatably adjusted relative to the compass card and means are provided to accomplish such rotatable adjustment. For this purpose, the hub 18 is somewhat elongated and slidably receives the magnet 24, the latter having a suitable bore 26 for rotatable as well as vertical sliding movement on the hub 18, as will be more apparent hereinafter. Magnet 24 has an integral pointer or finger member 28 which projects through an elongated horizontal slot 30 in the compass card, this slot being provided with bottom serrations 32 for the reception of the pointer 28. In this regard the pointer 28 is of selected shape such that it engages any one of the serrations and thereby locks the compass card 14 and magnet 24 together for unitary rotation.

Figure 3:
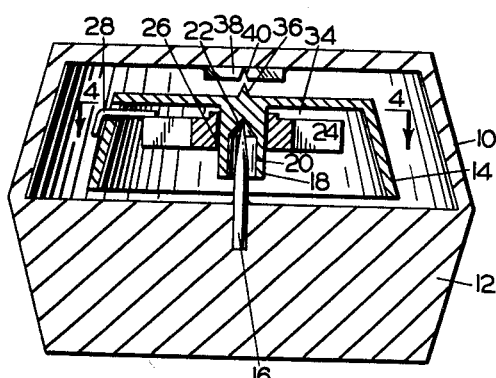
FIG. 3 is a sectional view taken on the line 3—3 of FIG. 1.
Figure 4:
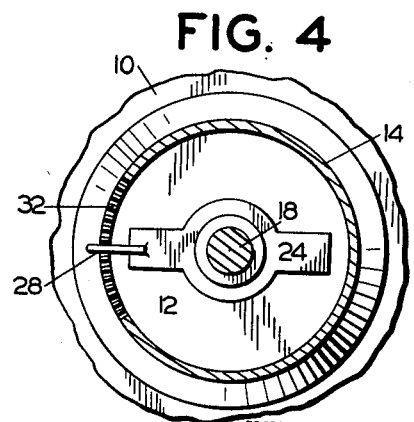
FIG. 4 is a fragmentary sectional view taken on the line 4—4 of FIG. 3.

Magnet 24 is supported vertically by the pointer 28 which rests in any one of the serrations 32. However, as apparent in FIG. 3, the magnet 24, as supported by the pointer 28, is spaced a slight distance, designated by the numeral 34, below the under surface of the top of the compass card 14. Space permits the magnet 24 to slide upwardly on the hub 18 a distance sufficient to disengage the pointer 28 from the serrations 32, whereby relative rotation between the compass card and the magnet can be accomplished.

The needle support 16 and the compass card 14 are arranged such that the latter is spaced from the top inside surface of the housing 10 to permit free rotation of the compass card. Lock means are provided between the housing 10 and the compass card for the purpose of preventing rotation of the latter in an adjusting function. For this purpose, compass card 14 carries on its top surface an integral tooth or rib 36 and the undersurface of the top of housing 10 has an integral lock plate 38. Lock plate 38 has a plurality of V-shaped, diametrically arranged grooves 40 and through the medium of this structure, upon upward movement of compass card 14 the tooth 36 engages one of the grooves 40 to lock the compass card 14 against rotation. In normal operation of the compass, the parts are in the position shown in FIG- URES 1 and 3, but when being adjusted the parts, comprising the compass card and the magnet, are in the position shown in FIGURE 2.

Figure 2:
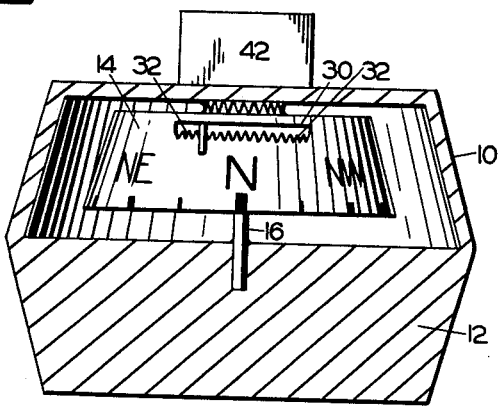
FIG. 2 is also a side elevational view but showing the parts in a position for adjusting the magnet relative to the compass card.

Rotative adjustment of the magnet 24 relative to the compass card is accomplished by a key member 42 in the form of a magnet. For this purpose the magnet key 42 is positioned on the top surface of the housing 10 over the magnet 24, as illustrated in FIGURE 2. The magnet key 42 is located such that its poles are oppositely disposed from those of the magnet 24 for attracting the latter and moving it upwardly. Upward movement of the magnet 24 causes it to slide upwardly on the hub 18 and abut against the under-surface of the top of compass card 14. Upward movement of magnet 24 also raises the compass card to the positon of FIGURE 2 wherein tooth 36 is engaged in one of the grooves 40. This upward movement serves both to disengage the pointer 28 from the serrations 32 and lock the compass card 14 against rotation relative to the housing. Thereby, upon rotating the magnet key 42, the magnet 24 rotates therewith, and since the compass card is held stationary the proper amount of adjustment can be made wherein the north designation on the compass card will be directed to the north geographic pole. After suitable adjustment has been made, the magnet 42 is removed whereupon the compass card and magnet 24 will drop into their normal operating condition. At the same time, pointer 28 engages a serration 32 vertically aligned therewith and a unitary rotative association is provided between the compass card and its magnet in the newly adjusted condition. The number of degrees of adjustment of the magnet relative to the compass card for a certain location can be set by the designations on the compass card which are most generally marked off in degrees.

Figure 5:
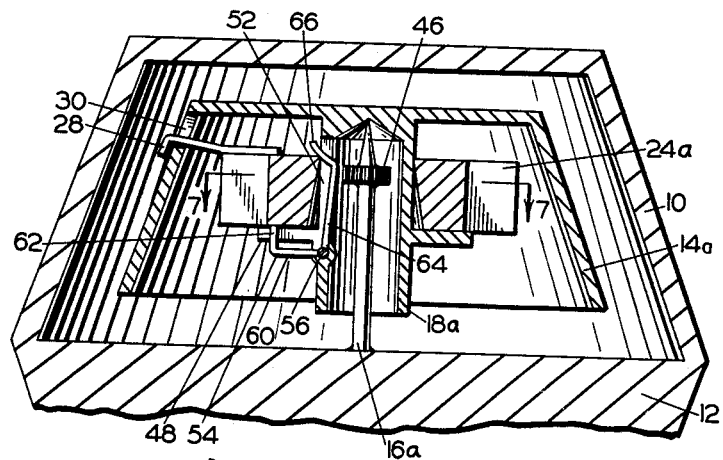
FIG. 5 is a central vertical sectional view of a compass embodying a second form of the invention.
Figure 6:
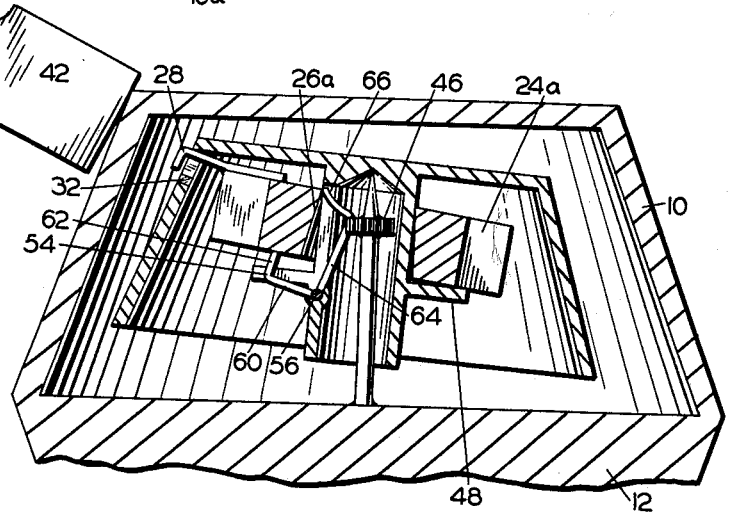
FIG. 6 is a view taken similarly to FIG. 5 but showing the parts in a position for adjustment.
Figure 7:
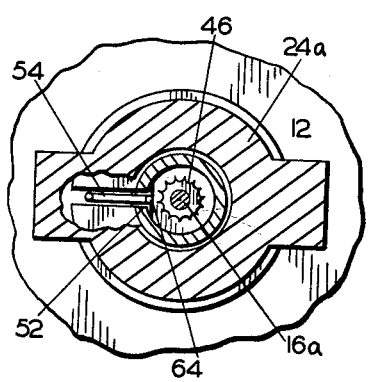
FIG. 7 is a fragmentary sectional view taken on the line 7—7 of FIG. 5.

In a second form of the invention, shown in FIGS. 5-7, a somewhat modified means of adjustment is utilized, although a magnet key 42 is still employed. In this embodiment, there is similarly illustrated a housing 10 and base 12. Secured to the base 12 is a needle point support 16a for a compass card 14a. The support 16a in this embodiment has an integral toothed disc 46 adjacent its upper end.

Hub 18a of the compass card has an integral flange 48 intermediate its ends for supporting a magnet 24a which, similar to the first embodiment has an integral pointer 28 projecting through an elongated horizontal slot 30 in the compass card. Slot 30 similarly has bottom serrations 32.

The central bore 26a of magnet 24a is flared or tapered outwardly toward the bottom in order to permit tilting of the magnet relative to the hub 18a as apparent in FIG. 6. Hub 18a as well as flange 48 are slotted vertically at 52, best seen in FIG. 7, and pivotally operable in said slot is a locking member 54, the pivotal mounting of the locking member being accomplished by a pin 56 secured in the hub across the lower end of the slot.

Locking member 54 has a first arm portion 60 which projects horizontally and this arm portion has an upturned end 62 which abuts against the lower surfae of the magnet 24a. A second arm portion 64 extends upwardly substantially parallel with the hub 18a and has an outwardly angled end 66 which abuts against the top bore edge of the magnet. The locking member is pivoted clockwise when the magnet is tilted as shown in FIG. 6 by the engagement of the angled end 66 with the bore edge of the magnet and is returned to its normal position when the magnet returns by the engagement of the upturned end 62 with the bottom surface of the magnet. As seen in FIG. 6, when the magnet is tilted it causes the locking member portion 64 to engage the toothed disc 46 which serves to lock the compass card in a non-rotative position.

Thus, to correct an angle of declination, an outside magnet 42 is positioned at the upper edge of the housing 10. The attraction of this magnet causes the magnet 24a to tilt as shown in FIG. 6, with the result that the pointer 28 disengages from the serrations 32 of slot 30 and the locking member engages toothed disc 46. Thus, since the magnet 24a and compass card 14 are disengaged for relative rotation and since the latter is anchored to the housing by the locking member, rotative movement of the magnet 42 relative to the housing is effective to position the magnet 24a in a desired corrected position.

Upon removal of magnet 42, the magnet 24a returns to its horizontal position which is a position wherein the pointer 28 locks the magnet and compass card together and the locking member 54 is released from the disc 46.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A magnetic compass comprising a housing, a compass card having a downwardly extending hub rotatably supporting the compass card in said housing, and a magnet mounted on said hub for vertical movement, said magnet having a lowered position connected to said compass card for unitary rotation therewith and a raised position disconnected from said compass card for adjustable rotation relative to the latter.

2. The magnetic compass of claim 1 including vertically releasable lock means between the compass card and the magnet for accomplishing said adjustable rotation.

3. The magnetic compass of claim 2 wherein said compass card has a serrated slot therein and said releasable lock means comprises a finger member on said magnet releasably engageable with said serrated slot.

4. The magnetic compass of claim 1 wherein said compass card has a serrated slot therein and said releasable lock means comprises a finger member on said magnet releasably engageable with said serrated slot, and means for releasably locking said compass card against rotation relative to the housing.

5. A magnetic compass comprising a housing, a compass card supported in said housing for rotation in a horizontal plane, and a magnet slidably mounted on said compass card below a portion of the latter, said magnet having a first position connected to said compass card for unitary rotation therewith and having a second position disconnected from said compass card for adjustable rotation relative to the latter.

6. A magnetic compass comprising a housing, a top wall on said housing, locking means on the under surface of said top wall, a compass card supported in said housing for rotation in a horizontal plane and being movable vertically between a lower freely rotating position and an upper locked position in engagement with said locking means, said compass card being in spaced relation from said top wall, a downwardly projecting hub on said compass card, said compass card having a serrated slot, a magnet slidably and rotatably engaged with said hub in spaced relation from said compass card, and a finger member on said magnet projecting through said serrated slot and supporting said magnet on said hub in spaced relation to said compass card, said finger member engaging the serrations of said slot for normally connecting the magnet and compass card, said magnet being movable upwardly to disengage the finger member from said serrations to permit rotational adjustment of said magnet relative to said compass card and to engage the compass card with said locking means on the housing to prevent rotation of said compass card during said adjustment.

7. A magnetic compass comprising a housing, a support in said housing, a compass card rotatably supported on said support and having a downwardly projecting hub, said compass card having a serrated slot, a stationary toothed member on said support, a magnet rotatably and tiltably mounted on said hub, a finger member on said magnet projecting through said serrated slot to engage serrations therein to connect said magnet and compass card but adapted to be disengaged from said serrations when the magnet is tilted to permit relative rotation of said magnet and compass card, and a locking member on said compass card disposed between said magnet and said toothed member for engaging the latter in a tilted position of the magnet for locking the compass card against rotation, whereby in a normal position of said magnet said finger member engages one of said serrations to lock said magnet and compass card for unitary rotation and in a tilted position of the magnet said finger member is disengaged from the serrations and said locking member engages said toothed member to permit relative adjustable movement of said magnet and compass card.

References Cited by the Examiner

UNITED STATES PATENTS

| | | |
|---|---|---|
| 1,332,027 | 2/20 | Bunker. |
| 2,108,263 | 2/38 | L'Abee-Lund _____ 33—224 |
| 2,587,254 | 2/52 | Victoreen _____ 317—159 X |
| 2,630,778 | 3/53 | Hatch _____ 317—159 X |

FOREIGN PATENTS

| | | |
|---|---|---|
| 431,275 | 9/11 | France. |
| 734,712 | 8/32 | France. |
| 246,650 | 2/26 | Great Britain. |
| 288,412 | 4/28 | Great Britain. |

ROBERT B. HULL, *Primary Examiner.*